United States Patent [19]
Sasuta

[11] Patent Number: 5,093,926
[45] Date of Patent: Mar. 3, 1992

[54] TRUNKED COMMUNICATION SYSTEM SCANNING METHOD AND APPARATUS

[75] Inventor: Michael D. Sasuta, Palatine, Ill.

[73] Assignee: Motorola, Inc., Schaumburg, Ill.

[21] Appl. No.: 414,827

[22] Filed: Sep. 29, 1989

[51] Int. Cl.$^5$ .......................... H04Q 7/02; H04B 15/00
[52] U.S. Cl. .......................................... 455/34; 455/56; 455/62
[58] Field of Search ................. 455/33, 34, 62, 52, 455/54, 56, 67; 379/60, 63, 59

[56] References Cited

U.S. PATENT DOCUMENTS

| | | | |
|---|---|---|---|
| 4,475,010 | 10/1984 | Huensch et al. | 379/60 |
| 4,573,206 | 2/1986 | Grauel et al. | 455/56 |
| 4,670,905 | 6/1987 | Sandvos et al. | 379/60 |
| 4,750,198 | 6/1988 | Harper | 379/59 |
| 4,794,635 | 12/1988 | Hess | 379/60 |
| 4,833,701 | 5/1989 | Comroe et al. | 455/33 |
| 4,905,301 | 2/1990 | Krolopp et al. | 455/34 |

Primary Examiner—Reinhard J. Eisenzopf
Assistant Examiner—Lisa D. Charouel
Attorney, Agent, or Firm—Timothy W. Markison; Steven G. Parmelee; Joseph P. Krause

[57] ABSTRACT

A communication unit having a dynamic control resource scan list utilizes the scan list to more effectively roam from the current trunked communication system to other trunked communication systems. The scan list contains control resource information of trunked communication systems, where the control resource information is the control resources of the system and the features offered by that system.

7 Claims, 3 Drawing Sheets

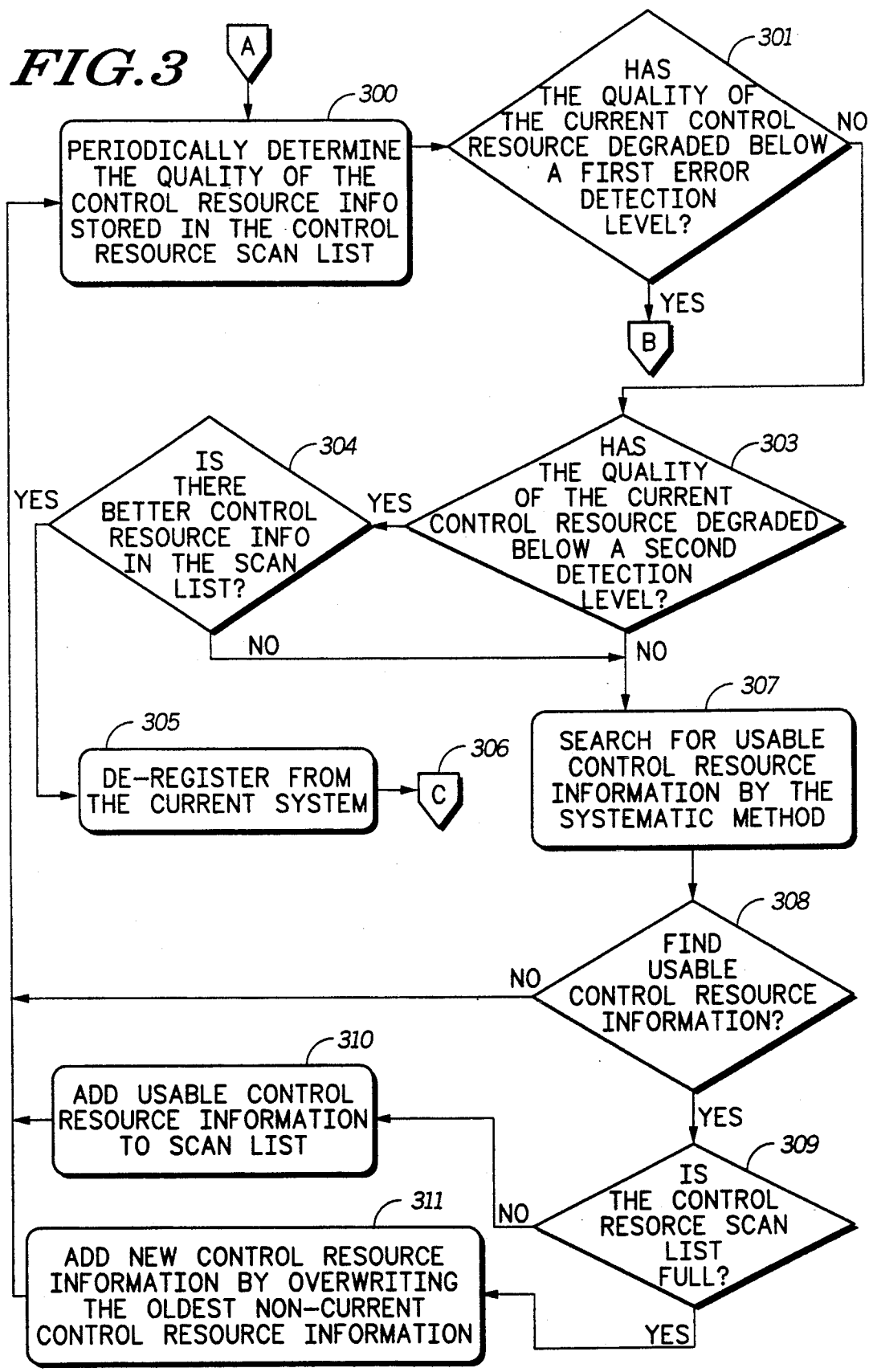

TRUNKED COMMUNICATION SYSTEM SCANNING METHOD AND APPARATUS

TECHNICAL FIELD

This invention relates generally to trunked communication systems, and in particular to a method and apparatus for communication units to more efficiently roam among trunked communication systems.

BACKGROUND OF THE ART

Trunked communication systems that support both dispatch and cellular services are known to consist of a resource controller that allocates a limited number of communication resources among a plurality of communication units. To access one of the communication resources, a communication unit sends an inbound signalling word (ISW) to the central controller via a control resource. Typically, a trunked communication system has four possible control resources, of which only one (the current control resource) is used at any given time. The system also periodically changes which control resource it uses. If the central controller recognizes the communication unit by the ISW sent, the central controller will allocate one of the communication resources, if one is available. Generally, a communication unit may be a mobile unit or a portable unit, where a mobile unit is designed to be installed in a vehicle and a portable is designed to be carried on or about the person.

Trunked communication systems that allow communication units to roam from one system to another are also known, as disclosed in U.S. Pat. No. 4,833,701, issued to Comroe et al., assigned to Motorola, Inc., incorporated herein. Typically, a roaming communication unit will not scan for another trunked communication system until communication with the current system is lost. Loss of communication typically occurs when the communication unit detects twelve accumulated bad decode conditions on the control resource of the current system. Once communication is lost, the roaming communication unit systematically scans a control resource spectrum until it finds a usable control resource (the systematic scanning process is discussed below). Once the communication unit finds a usable control resource of a trunked communication system, it attempts to register with that system. If the system accepts the registration request, the system assigns a temporary roaming identification number to the communication unit such that the communication unit can communicate within the system. If the system does not accept the registration request or no system responds to the registration request, the communication unit must find another usable control resource and attempt to register with that system.

The systematic scanning process consists of sequentially searching the control resource spectrum for control resource activity. In a dispatched trunked communication system, the allocated spectrum currently consists of up to 1500 frequencies, each representing a possible control resource. Having found control resource activity on a particular frequency, an error detection test is performed on that frequency. The error detection test typically consists of determining whether there is an unacceptable error detection level of twelve bad decode conditions, or more. If the error detection test yields more than twelve bad decode conditions, the systematic scanning process must continue. Generally, it requires 80 mSec for the communication unit to determine that a particular frequency is unusable as control resource, and it takes 150 mSec for the communication unit to determine that a particular frequency is usable as a control resource. Thus, with up to 1500 frequencies in the control resource spectrum, it may take a communication unit in excess of two minutes to find a usable control resource.

Therefore, a need exists for a method and apparatus that will allow a communication unit to more efficiently find useable control resources when roaming from trunked communication system to trunked communication system.

SUMMARY OF THE INVENTION

This need and others are substantially met by the trunked communication system scanning method and apparatus, as disclosed herein. The method for a communication unit having a dynamic control resource scan list to roam from a trunked communication system which it is currently registered to other trunked communication systems comprises the steps of determining that the quality of communication with the current trunked communication system has degraded, scanning the dynamic control resource scan list for usable control resource information, and operating, thereafter, in a trunked communication system having the usable control resource information.

In one embodiment, the communication unit determines that the quality of communication has degraded below a first error detection level such that communication with the current system is lost. The communication unit will scan priority entries within the dynamic control resource scan list first, where priority entries are alternate control resources of the current system. If the scan of the priority entries fails to yield a usable control resource, the communication unit will check the remaining entries in the dynamic control resource scan list. If there are no usable control resources in the dynamic control resource scan list, then the communication unit will perform a systematic scan of a control resource spectrum, periodically rechecking the dynamic resource scan list until a usable control resource is found.

In another embodiment, the communication unit determines that the quality of communication with the current system has degraded below a second error detection level but not below the first error detection level, such that the quality of communication with the current system is not optimal. When such a condition exists, the communication unit will check the dynamic control resource scan list for control resource information having a higher quality of communication than the control resource information of the current system. Wherein higher quality of communication is based on at least the accumulated bad decodes of control resources and may also be based on the compatibility of features between the communication unit and a trunked communication system.

In yet another embodiment, the dynamic control resource scan list is updated by acquiring control resource information from the current system and/or the systematic scanning method, determining whether the acquired control resource information is usable, and updating the dynamic control resource scan list with useable acquired control resource information. The updating of the dynamic control resource scan list further comprises prioritizing alternate control resources of the current system.

BRIEF DESCRIPTION OF THE DRAWINGS

FIGS. 2 and 3 illustrate a method of the present invention in which the roaming communication unit utilizes and updates the dynamic control resource scan list.

BEST MODE FOR CARRYING OUT THE INVENTION

Figure 1:
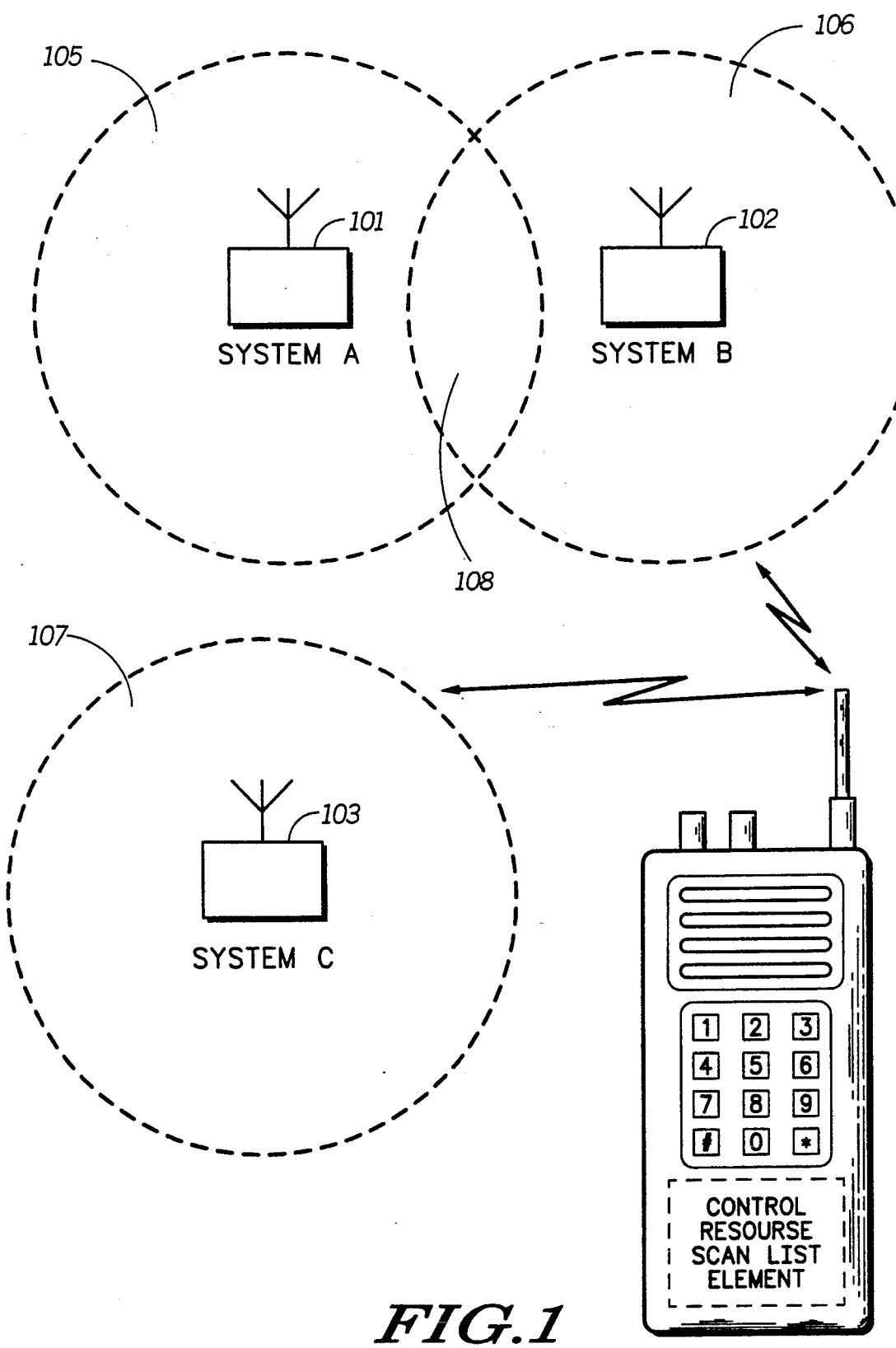
FIG. 1 illustrates a communication unit having a control resource scan list element and three trunked communication systems, A, B, and C, which the communication unit may roam into in accordance with the disclosed invention.

FIG. 1 illustrates a communication unit (100) having a control resource scan list element (104). The control resource scan list element (104) may be any electronically redefinable storage element, such as a programmable array or microprocessor, for storing, utilizing, and updating the dynamic control resource scan list. The dynamic control resource scan list comprises 32 entries, four per system; however, the size of the scan list may be varied to meet the needs of the communication unit. FIG. 1 also illustrates three trunked communication systems, A (101), B (102), and C (103). Each trunked communication system (101, 102, and 103) comprises, at least, a central controller (not shown), which accepts roaming communication units, and a coverage area (105, 106, and 107), where the coverage area (105, 106, and 107) is indicated by the dashed line encircling each system (101, 102, and 103). The systems (101, 102, and 103) may be independent systems, part of a trunked communication system network, part of a multi-site trunked communication system, or any combination thereof. Systems A and B (101 and 102) are shown have an overlapping coverage area (108).

Generally, a communication unit (100) utilizes and updates the dynamic control resource scan list to enhance its roaming efficiency. The communication unit (100) utilizes the scan list to register with a trunked communication system. When the communication unit (100) is registered with a trunked communication system (current system), it monitors the quality of communication with the current system. If the communication unit (100) determines that the quality of communication has degraded, it looks for usable control resource information by scanning the dynamic control resource scan list. The quality of communication can degrade to two levels. The first level indicates that the quality of communication has degraded below a first error detection level such that communication with the current system is lost. Typically, twelve bad decode conditions indicate that communication is lost; however, the level may be varied to meet the requirements of the communication unit (100). The second quality of communication level indicates that the quality of communication has degraded below a second error detection level but not below the first error detection level, such that communication with the current system is not optimal. The second error detection level is typically six accumulated bad decode conditions which may vary to suit the communication unit's requirements.

When the second error detection level is reached, the communication unit (100) scans the dynamic control resource scan list for better control resource information. (Control resource information contains, at least, control resources of a system and also typically includes features of that system.) When determining which control resource information is better, the communication unit (100) considers accumulated bad decode conditions of the control resources and the compatibility between the features of the communication unit (100) and the features of a trunked communication system, or both. Typical features of a system may be telephone interconnection, data requests, group dispatch, call alert, private calling, and/or status/message. If better control resource information exists, the communication unit deregisters from the current system and then attempts to register with the system having the better control resource information.

The communication unit (100) continually updates the dynamic control resource scan list with usable control resource information. When the communication unit (100) is registered with the current system, the scan list is updated by control resource information received from the current system. The control resource information may comprise the current and alternate control resources of the current system and of adjacent systems and the features of the current system and the adjacent systems. (Adjacent systems are trunked communication systems which are part of the same network or multi-site system as the current system.) During inactive times (not utilizing a communication resource) the communication unit (100) updates the status of all entries in the scan list. After updating the entries, the communication unit (100) performs a systematic scan of a control resource spectrum to find additional usable control resource information. If usable control resource information is found, it is added to the scan list. The communication unit (100) also updates the scan list when it is not registered to the current system by the systematic scan method.

Figure 2:
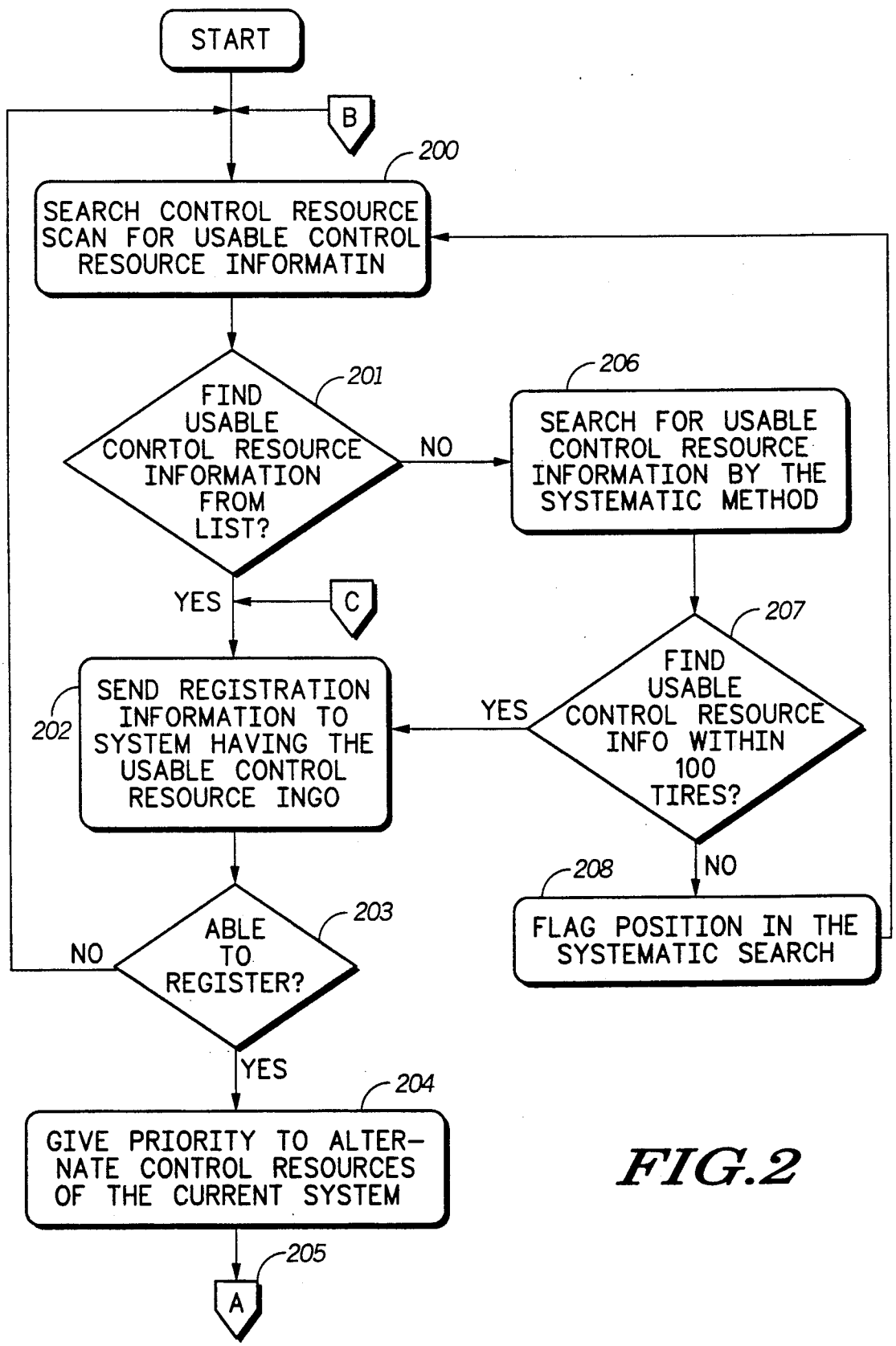

The scanning and updating method of the dynamic control resource scan list is further illustrated in FIGS. 2 and 3. FIG. 2 illustrates the process of actively searching for a trunked communication system. This process is exercised when the communication unit (100) is not registered with a system and is seeking a system. The communication unit scans the dynamic control resource scan list (200), checking the priority entries first. The priority entries are the control resource information of the system the communication unit (100) was last registered to. If the communication unit (100) finds usable control resource information in the scan list (201), it sends registration information to the system having the usable control resource information (202). If the communication unit is able to register with the system found in step 201 (203), the priority entries are updated to include the alternate control resources of the current system (204) and then commences the background scan (205) (the background scan is discussed below with reference to FIG. 3). If the communication unit (100) is not able to register (203), the process begins again at step 200. The communication unit (100) may not be able to register for several reasons such as the system does not allow for roaming communication units, all the temporary roaming identification numbers are assigned, or this particular communication unit (100) is not allowed access to the system.

If the communication unit (100) does not find usable control resource information in the scan list (201), it begins a systematic scan of a control resource spectrum (206). If usable control resource information is found before scanning 100 frequencies (207), the communication unit (100) sends registration information to that system as in step 202 and subsequent steps. If usable control resource information is not found after scanning 100 frequencies (207), the communication unit (100) flags its position in the systematic scan (208) and begins the active scanning process at step 200.

Once the communication unit (100) is registered with a system, it begins the background scan search as illustrated in FIG. 3. The background scan begins by periodically determining the quality of the control resource information stored in the scan list (300). If the quality of the current control resource has degraded below a first error detection level (301), the communication unit (100) deregisters from the current system and begins the active scan search again (302). If the quality of the current control resource has not degraded below the first error detection level (301), the communication unit (100) determines if it has degraded below a second error detection level (303). If the quality of the active control resource has degraded below the second error detection level (303), the communication unit (100) checks the scan list for better control resource information (304). If the scan list does not contain better control resource information than that of the current system (304), the communication unit (100) continues the background scan by searching for additional control resource information (307). The search for additional control resource information (307) and the remaining steps will be discussed below.

As mentioned above, better control resource information is determined by comparing the accumulated bad decode conditions of the control resources of the systems (current and any other system in the scan list) and compatibility of features between the communication unit (100) and the systems. When the communication unit (100) is in an overlapping coverage area (108), all of the above are generally taken into consideration. For example, if the communication unit (100) is registered to system A (101) and determines that, with respect to system A (101), there are eight accumulated bad decode conditions, the communication unit (100) will try to find better control resource information. If control resource information of system B (102) is stored in the scan list and the current control resource of system B (102) has, with respect to the communication unit (100), seven accumulated bad decode conditions, it would not be a significant benefit for the communication unit (100) to deregister from system A (101) and register with system B (103). Under these conditions, the communication unit (100) would compare features of system A (101) and system B (102) with the features it can utilize. If system B's (102) features are more compatible with the features of the communication unit (100), the communication unit (100) would deregister from system A (101), as shown in step 305, and then attempt to register with system B (102), as shown in step 306. The communication unit (100) may be programmed to utilize the control resource information stored in the scan list in any manner, thus the above discussion is only one possible outcome of the given situation.

If the current control resource has not degraded below the second error detection level (303), the communication unit will search for additional control resource information by the systematic method (307). If the communication unit (100) does not find any usable control resource information (308), the background scan repeats at step 300. If the communication unit (100) finds usable control resource information (308), it checks the scan list to determine if the scan list is full (309). If the scan list is full (309), the newly found control resource information is added to the scan list by overwriting the oldest, non-priority entries (310). If the scan list is not full (309), the newly found control resource information is added to the scan list (311). Once the newly found control resource information is added to the scan list, the background scan is repeated at step 300.

What is claimed is:

1. An improved method for a communication unit to roam from a current trunked communication system to another trunked communication system, wherein the communication unit is registered with the current trunked communication system, the method comprises the steps of:
   a) determining quality of control resource information of the current trunked communication system;
   b) when, at least part of, the quality of control resource information drops below a second predetermined error detection level, comparing, by the communication unit, the quality of control resource information of the current trunked communication with, at least, quality of priority control resource information and quality of control resource information of the another trunked communication system, wherein the priority control resource information and the control resource information and the control resource information of the another trunked communication system are stored in a dynamic control resource scan list; and
   c) when the quality of control resource information of the another trunked communication system exceeds the quality of the control resource information of the current trunked communication system, transmitting a registration packet to the another trunked communication system.

2. The method of claim 1 further comprises deregistering from the current trunked communication system when, at least part of, the quality of control resource information drops below a first predetermined error detection level.

3. The method of claim 1 further comprises receiving control resource information of adjacent trunked communication systems from the current trunked communication system when the communication unit is inactive.

4. The method of claim 3 further comprises updating the dynamic control resource scan list with the control resource information of adjacent trunked communication systems when the dynamic control resource scan list is not full.

5. The method of claim 1 further comprises systematically searching a control resource spectrum for usable control resource information when the communication unit is inactive.

6. The method of claim 5 further comprises updating the dynamic control resource scan list with usable control resource information until the dynamic control resource scan list is full.

7. The method of claim 6 further comprises overwriting nonpriority control resource information with the usable control resource information when the dynamic control resource scan list is full.

* * * * *